United States Patent
Flaris et al.

(10) Patent No.: US 6,228,948 B1
(45) Date of Patent: May 8, 2001

(54) HIGH MELT FLOW, HIGHLY-GRAFTED POLYPROPYLENE

(75) Inventors: Vicki Flaris, Tyler, TX (US); David John Mitchell, Kingston (CA)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/232,131

(22) Filed: Jan. 15, 1999

Related U.S. Application Data

(60) Provisional application No. 60/071,655, filed on Jan. 16, 1998.

(51) Int. Cl.[7] .......................... C08L 51/00; C08F 255/02; C08F 255/04

(52) U.S. Cl. .......................... 525/285; 525/240; 525/207; 525/301; 525/64; 525/69; 525/309

(58) Field of Search .................................... 525/285, 240, 525/301, 64, 69, 207, 309

(56) References Cited

U.S. PATENT DOCUMENTS

| | | | |
|---|---|---|---|
| 3,013,003 | 12/1961 | Maragliano et al. | 525/240 |
| 3,177,269 | 4/1965 | Nowak et al. | 525/263 |
| 3,177,270 | 4/1965 | Jones et al. | 525/263 |
| 3,862,265 | 1/1975 | Steinkamp et al. | 260/878 R |
| 3,987,122 | * 10/1976 | Bartz et al. | 525/193 |
| 4,001,172 | * 1/1977 | Steinkamp et al. | 525/285 |
| 4,612,155 | 9/1986 | Wong et al. | 525/74 |
| 5,955,547 | * 9/1999 | Roberts et al. | 525/285 |

FOREIGN PATENT DOCUMENTS 679562 9/1952 (BR).

* cited by examiner

Primary Examiner—James J. Seidleck
Assistant Examiner—Olga Asinovsky

(57) ABSTRACT

Modified polymers, particularly polyolefins with improved flow over that of polyolefin alone, are produced by reacting polypropylene, maleic anhydride monomer, and a peroxy initiator in a twin-screw extruder. The maleic anhydride monomer is injected as a fluid and is grafted onto the base polypropylene during the degradation/chain scissioning process. Novel, highly-grafted polymers with high melt flow and other useful properties are produced in pellet form.

8 Claims, 1 Drawing Sheet

HIGH MELT FLOW, HIGHLY-GRAFTED POLYPROPYLENE

RELATED APPLICATION

This application claims the benefit of U.S. Provisional Application No. 60/071,655 filed Jan. 16, 1998.

FIELD OF INVENTION

This invention relates to producing a polymeric composition to function as "adhesion promoters" for a number of applications. For example, the product of this invention can be dispersed in water and applied as an aqueous coating onto glass fiber. Other uses include improve dyeability and paintability of thermoplastic olefins (TPO). The product is also very effective as the fucntionalized source in formulations used for bonding dissimilar material to polypropylene substrates.

BACKGROUND OF THE INVENTION

There are numerous patents on grafting maleic anhydride and other monomers to polyolefins. For example U.S. Pat. No. 4,612,155 of R. A. Zelonka and C. S. Wong teaches the grafting of unsaturated monomers onto the polyolefins in an extruder.

U.S. Pat. No. 3,862,265 and its division No. 4,001,172, both issued to Steinkamp et al, disclose an extrusion reaction of polyolefins to a high level of grafting having melt flow rates (MFR) when measured at 230° C. that are claimed to be up to 1000 dg/min but for polypropylene (PP) only up to 71 dg/min. The percent of maleic anhydride grafted to PP is shown to be only up to 0.53% by weight. These patents show that the use of a special reaction zone within an extruder can be chosen to effect intensive mixing of added reactants to a polymer or distribution of the added reactants to a polymer. The process allows not only the polymer to be modified in terms of its rheology but it may also be simultaneously modified by chemical means.

British Patent No. 679,562 shows graft polymerization of polymers when subjected to suitable mechanical mixing through filters or capillary tubes at high linear velocities.

U.S. Pat. Nos. 3,177,270 and 3,177,269 each discloses the formation of a graft copolymer by adding a monomer and an initiator. The products are "malaxed" to such a low degree that no degradation takes place.

U.S. Pat. No. 3,013,003 shows that degradation in an extruder can be controlled by utilizing a stabilizer.

The patents noted above do not disclose the art of producing a material having a melt flow rate (MFR) above 500 dg/min in an extruder or a material that is pelletizable, or a highly-grafted material. Some of the previous patents state total amounts, not actual grafted amounts of monomer in a polyolefin product.

SUMMARY OF THE INVENTION

The present invention provides in one aspect, a polymer composition comprising a grafted polypropylene polymer having a melt flow rate (MFR) of at least 500 dg/min as measured by ASTM standard E-1238 (190° C., 2160 g) and a grafted monomer content of at least 1 weight percent of functionalized polypropylene.

In another aspect the invention provides a polymer composition comprising a polypropylene polymer with up to 10 weight % ethylene, having grafted to it at least about 1.0 weight percent maleic anhydride measured by FTIR spectroscopy and a melt flow rate of at least about 500 dg/min when measured at 190° C. with a load of 2160 g. The polymer may be a homopolymer or a copolymer of polypropylene.

In yet another aspect the invention provides a method for making a polymer composition comprising a grafted polypropylene polymer having a melt flow rate (MFR) of at least 500 dg/min as measured by ASTM standard E-1238 (190° C., 2160 g) and a grafted monomer content of at least 1 weight percent of functionalized polypropylene, which comprises placing in a twin screw extruder, the propylene polymer, maleic anhydride, and peroxide initiator, mixing them in the extruder, while venting volatiles, and extruding the polymer through a die as strands and chopping the strands into pellets.

DETAILED DESCRIPTION OF THE INVENTION

Grafting Polyolefin with Grafting Monomer

Figure 1:
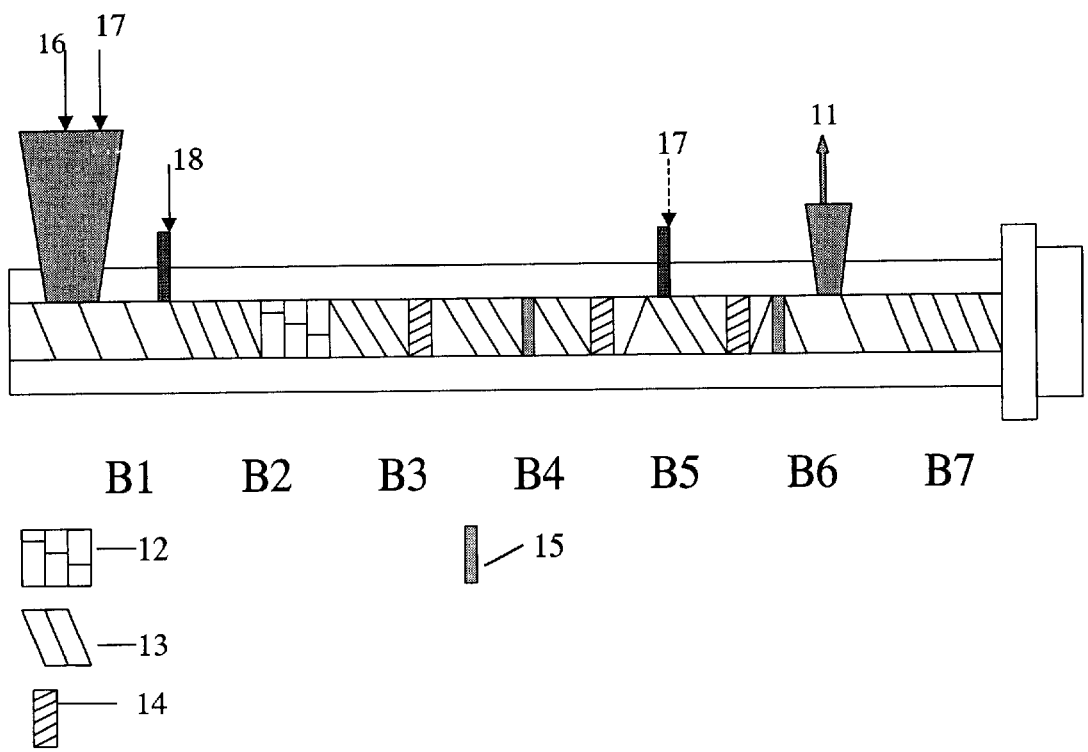
FIG. 1 is a schematic view of a reactive extruder used in the process of the invention.

The term "grafted polymer" is used herein to describe a polymer formed from at least one of a homopolymer of propylene, copolymers of ethylene and propylene especially copolymers of propylene with minor amounts of ethylene as in impact and random copolymers of propylene.

The term "grafting monomer" is used to describe at least one monomer selected from ethylenically unsaturated carboxylic acids and ethylenically unsaturated carboxylic acid anhydrides. Derivatives of such acids, and mixtures thereof may also be used. Examples of the acids and anhydrides are mono-, di- or polycarboxylic acids such as acrylic acids, methacrylic acid, maleic acid, fumaric acid, itatonic acid, crotonic acid, itatonic anhydride, maleic anhydride and substituted maleic anhydride, e.g., dimethyl maleic anhydride or citrotonic anhydride, nadic anhydride, nadic methyl anhydride, and tetrahydrophtahlic anhydride, maleic anhydride being particularly preferred. Examples of the derivatives of the unsaturated acids are salts, amides, imides and esters, e.g., mono- and disodium maleate, acrlyamide, maleimide, glycidyl methacrylate and dimethyl fumarate.

The above mentioned monomers can be grafted onto a polypropylene backbone in the presence of a peroxide initiator in an extruder. The resulting grafted polymer shows appreciable degradation evidenced by an increase in the melt flow rate as compared to the base polymer.

In the process of this invention, polypropylene and peroxide liquid are introduced into the throat of an extruder. Maleic anhydride (MA) is heated above its melting point and injected as a liquid into the barrel 1 (see FIG. 1). For some cases additional peroxide may be fed a second time into the extruder, in liquid form, downstream into the barrel 5.

The preferred peroxide initiator used is Lupersol 101™ (L1101) made by Atochem, containing by weight, 90% 2,5dimethyl-2,5 di (tert butyl peroxide) hexane; 4–6% 3,3,6,6tetramethyl-1,2dioxacyclohexane; 2–4% di (tert butyl) peroxide, and 0.1–0.3% 2,2,5,5tetramethyl droxfuran.

The extruder used for carrying out the grafting process is 43-mm co-rotating twin screw extruder with 7 heating/cooling barrels. The length/diameter ratio of this extruder is 38/1. For the most part, the temperature profile for each of the 7 barrels and the final die may be set as follows (° C.): 175, 190, 215, 215, 215, 200, 170, and for the die (° C.): 180. A vent port is located at barrel 6 drawing a vacuum of at least 200 mm Hg.

A schematic of the screw design is shown in FIG. 1. Wide pitch conveying elements (13) are employed initially to move away quickly the base resin from the feeding section (16,17) followed by a kneading block zone (12) (B2) to impart high shear to melt the polymer (16) (B1). Mixing gears (14) are then used to distribute evenly the monomer (16) and the initiator (18) into the melt as the reaction temperature is increased. Blisters (15) and reverse pitch elements are put in place to provide fully filled zones (B3 to B5) with "back-mixing". A blister (15) is used before the vent zone (11) (B6) to provide a melt seal. In the vent zone (B6) wide pitch conveying elements (13) are used to provide maximum surface to volume ratio for effective removal of the unreacted monomer. Narrow pitch conveying elements (13) at the end (B7) provide good pumping for pushing the polymer melt out of the die. Several screw designs with different severity in the reaction zone were used in the following examples which worked equally well in obtaining desired products.

A deep trough with cold water is used to quench the strands after they exit the die. A strand pelletizer was employed to pelletize the solidified strand.

Analytical Techniques
Melt Flow Rate (MFR)

Melt flow rate (MFR) of polypropylene could be measured at 190° C., 2160 g (ASTM 1238E). As the molecular weight of polypropylene is generally reduced significantly during the grafting process, the melt flow rate was measured at the lower temperature of 170° C. and the lower weight of 325 g. A calibration curve was constructed at the 170° C. conditions vs. that at 190° C. resulting in the following correlation:

$$MFR(190° C., 2160 g) = 844.8 \, Log_{10}[MFR(170° C., 325 g)] - 715.3$$

This equation was used to convert MFR measured at 170° C. and 325 g to standard ASTM 1238E conditions (190° C., 2160 g.).

Percent Grafted Maleic Anhydride by Weight (% MA)

The maleic anhydride (MA) content of the polyolefins could be determined via titration. The polymer sample are placed in a vacuum oven to remove the residual MA, then dissolved in refluxing xylene-butanol mixture where maleic anhydride is converted to a half ester. The solution is titrated hot with a base to the end point to determine the maleic anhydride content.

In the examples, the amount of maleic anhydride grafted to the polypropylene was determined by Fourier Transformed Infrared (FTIR) spectroscopy of films pressed from the sample products. A Bomem MB-100™ FTIR spectrometer was used. The intensity of the grafted-anhydride absorbance band was measured and normalized for film thickness. The graft level was calculated based on the calibration curve of absorbance vs. graft level obtained by titration method as described above.

EXAMPLES

Example 1

A homopolymer-based polypropylene, designated as grade "A" with MFR of 3.4 dg/min (230° C., 2160 g) was used as the base resin (Table 1—1 through 5). The extruder configuration was set as described in the detailed description relative to FIG. 1. The extruder was first fed with the base resin at 500 g/min. Maleic anhydride was then injected at variable rates of 1.75, 2.6, or 3.5 wt % of the base resin as indicated in Table 1. Finally the peroxide initiator (L101) was added at the rates of 0.5, 1.25, or 2 wt % of that of the base resin. Novel, pelletized polypropylene resin with melt flow rates of above 500 dg/min and a graft level in excess of 1 weight percent was made in each setting. Increasing peroxide feed rate resulted in products with higher melt flow rates and slightly higher graft level. Increasing maleic anhydride level improves the overall graft levels somewhat but adversely affects the graft yield.

In runs 6 through 8, an alternate homopolymer based polypropylene, grade "B" with MFR of 1.2 dg/min. was used. The plus sign "+" indicates a split in the feed. In all these cases, products with MFR above 500 dg/min and graft level in excess of 1 weight percent were obtained.

TABLE 1

| | Base Polymer | Screw RPM | PP Feed Rate (g/min) | L101 (g/min) | MA (g/min) | MFR (dg/min) | Grafted MA (wt %) | Graft Yield (%) |
|---|---|---|---|---|---|---|---|---|
| 1 | Grade A | 225 | 500 | 2.50 | 8.75 | 701 | 1.15 | 65.7 |
| 2 | Grade A | 225 | 500 | 2.50 | 17.5 | 593 | 1.35 | 38.6 |
| 3 | Grade A | 275 | 500 | 6.25 | 13.0 | 943 | 1.37 | 52.7 |
| 4 | Grade A | 275 | 500 | 10.0 | 8.75 | 884 | 1.21 | 69.1 |
| 5 | Grade A | 275 | 500 | 11.56 | 17.5 | 1071 | 1.72 | 49.1 |
| 6 | Grade B | 225 | 450 | 2.50 | 8.75 | 810 | 1.09 | 62.3 |
| 7 | Grade B | 225 | 450 | 1.25+1.25 | 8.75 | 759 | 1.11 | 63.4 |
| 8 | Grade B | 225 | 450 | 1.25+1.25 | 4.38+4.38 | 810 | 1.03 | 58.8 |

Example 2

In this example, homopolymer based polypropylene grades with higher initial melt flow rates were used (Grades C, D and E). The MFR (230° C., 2160 g) for grades C, D and E are 10, 22 and 35 dg/min. respectively. The procedure was essentially the same as that of Example 1.

TABLE 2

|    | Base Polymer | Screw RPM | PP Feed Rate (g/min) | L101 (g/min) | MA (g/min) | MFR (dg/min) | Grafted MA (wt %) | Graft Yield (%) |
|----|--------------|-----------|----------------------|--------------|------------|--------------|-------------------|-----------------|
| 9  | Grade C      | 275       | 500                  | 10           | 17.5       | 1245         | 2.28              | 65.1            |
| 10 | Grade D      | 275       | 500                  | 10           | 17.5       | 1370         | 1.95              | 55.7            |
| 11 | Grade E      | 375       | 500                  | 10           | 17.5       | 1376         | 2.18              | 62.3            |

As shown products made using these alternate, higher flow based PP, grades resulted in considerably higher melt flow rate (over 1200 dg/min) and graft level (about 2 weight percent) as compared to those obtained in Example 1.

Example 3

This example indicates that use of a homopolymer PP, Grade F, with much higher MFR (115 dg/min at 230° C., 2160 g.). Under similar processing conditions (conditions 12–15) as Example 2 but with much higher levels of maleic anhydride fed, the products did not have higher MFR when compared to those of Example 2. Feeding very high level of maleic anhydride also did not result in improved graft levels (below 2 weight percent). In fact, it results in a sharp decline in graft yield (%).

Decreasing the PP feed level to only 151 g/min. with corresponding reductions in peroxide and monomer feed levels resulted in products with similar MFR but substantially higher graft level. Graft levels in excess of 3.5 weight percent (conditions 16,18 and 20) were obtained as well as high graft yield. The improved maleic anhydride content and reaction yield can be contributed to much longer residence time as lower throughput rates and lower screw speeds (rpm) were used. A split feed (*) of peroxide was used to determine its effect on both graft level and MFR (conditions 19 and 20).

Example 4

This example demonstrates the use of copolymers of ethylene and propylene for both impact and random copolymers when used as the base resin for this invention. In run 21 using an ethylene(5.7 weight percent)-propylene random copolymer (grade G) with similar processing conditions as in previous examples resulted in product having MFR of 897 dg/min and a maleic graft level of 2.3 weight percent. Switching to an alternate random copolymer base resin (grade H, 4 weight percent ethylene), MFR of 500 dg/min and above with graft levels in excess of 1 weight percent were obtained (22, 23).

Experiments 24 through 34 were carried out in a longer (48 L/D) co-rotating twin screw extruder. In all these cases a split peroxide initiator was employed where Lupersol 101™ was fed as a coated master-batch. It appeared that use of liquid peroxide vs. coated master-batch produced similar results (24 vs. 25 and 26 vs. 27). Once again increasing maleic anhydride feed rate results in higher Grafted MA but graft yield decreased (28–30). The MFR appears to increase somewhat as the maleic anhydride feed rate is increased. Increasing the peroxide feed level increase both MFR and graft content (31). As before lowering the PP feed rate, increased further the graft content (32). Finally using a higher ethylene content resin, i.e., Grade I, resulted in similar graft level and somewhat lower MFR as that with slightly lower ethylene content, Grade H, (compare 33, 34 vs. 28,29 respectively).

TABLE 3

|    | Base Polymer | Screw RPM | PP Feed Rate (g/min) | L101 (g/min) | MA (g/min) | MFR (dg/min) | Grafted MAH (wt %) | Graft Yield (%) |
|----|--------------|-----------|----------------------|--------------|------------|--------------|--------------------|-----------------|
| 12 | Grade F      | 225       | 378                  | 6.92         | 26.2       | 1005         | 1.59               | 22.9            |
| 13 | Grade F      | 225       | 378                  | 7.35         | 31.4       | 1254         | 1.70               | 20.5            |
| 14 | Grade F      | 225       | 378                  | 13.84        | 31.4       | 791          | 1.55               | 18.7            |
| 15 | Grade F      | 225       | 378                  | 8.91         | 25.0       | 1000         | 2.02               | 30.5            |
| 16 | Grade F      | 175       | 151                  | 3.02         | 6.6        | 1283         | 3.86               | 88.3            |
| 17 | Grade F      | 175       | 151                  | 5.53         | 12.6       | 1063         | 1.93               | 23.1            |
| 18 | Grade F      | 175       | 151                  | 3.02         | 6.6        | 1307         | 3.51               | 80.3            |
| 19 | Grade F      | 175       | 151                  | 5.53+3.80*   | 12.6       | 1050         | 2.19               | 26.2            |
| 20 | Grade F      | 175       | 151                  | 5.53+2.85*   | 12.6       | 1210         | 4.10               | 49.1            |

TABLE 4

|    | Base Polymer | Screw RPM | PP Feed Rate (g/min) | L101 (g/min) | MA (g/min.) | MFR (dg/min) | Grafted MA (wt %) | Graft Yield (%) |
|----|--------------|-----------|----------------------|--------------|-------------|--------------|-------------------|-----------------|
| 21 | Grade G[1]   | 275       | 500                  | 11.56        | 17.5        | 897          | 2.3               | 65.7            |
| 22 | Grade H[2]   | 225       | 500                  | 2.48*        | 11.0        | 494          | 1.37              | 62.2            |
| 23 | Grade H      | 225       | 400                  | 1.60         | 11.0        | 559          | 1.56              | 70.9            |
| 24 | Grade H      | 200       | 500                  | 1.47*+1.75*  | 9.0         | 502          | 1.30              | 72.2            |
| 25 | Grade H      | 200       | 500                  | 1.47+1.75*   | 9.0         | 522          | 1.28              | 71.1            |
| 26 | Grade H      | 200       | 500                  | 1.93+1.29*   | 9.0         | 504          | 1.34              | 74.4            |
| 27 | Grade H      | 200       | 500                  | 1.93*+1.29*  | 9.0         | 534          | 1.43              | 79.4            |
| 28 | Grade H      | 190       | 500                  | 1.84*+1.38*  | 11.0        | 589          | 1.55              | 71.1            |
| 29 | Grade H      | 190       | 500                  | 1.84*+1.38*  | 13.1        | 643          | 1.75              | 66.8            |
| 30 | Grade H      | 190       | 500                  | 1.84*+1.38*  | 15.0        | 611          | 1.85              | 60.3            |
| 31 | Grade H      | 190       | 500                  | 2.21*+1.66*  | 15.0        | 661          | 2.05              | 68.1            |
| 32 | Grade H      | 190       | 420                  | 2.21*+1.66*  | 14.8        | 611          | 2.13              | 56.2            |
| 33 | Grade I[3]   | 190       | 500                  | 1.93*+1.38*  | 11.1        | 530          | 1.67              | 73.9            |
| 34 | Grade I[3]   | 190       | 500                  | 1.93*+1.38*  | 13.4        | 546          | 1.63              | 60.4            |

[1]Grade G ethylene-propylene random copolymer (5.7 wt %) with a MFR of 5.0 dg/min.
[2]&[3]Grades H and I are ethylene-propylene random copolymers with 4% and 6% ethylene contents respectively. Both Grades have MFR's of 5.0 dg/min. (230° C., 2160 g).
*In those values designated with (*) Peroxide was coated on pellets and it was fed as a master-batch.
+Peroxide was added down stream as well as the throat.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

What is claimed is:

1. A polymer composition comprising a grafted polypropylene polymer having a melt flow rate (MFR) of at least 500 dg/min as measured by ASTM standard E-1238 (190° C., 2160 g) and a grafted monomer content of at least 1 weight percent of functionalized polypropylene.

2. A polymer composition as claimed in claim 1 wherein the polypropylene polymer is selected from the group comprising homopolymers of propylene and copolymers of ethylene and propylene.

3. The polymer composition as claimed in claim 1 wherein the polypropylene polymer is selected from the group comprising copolymers of propylene with minor amounts of up to 10 weight percent ethylene.

4. The polymer composition as claimed in claim 3 wherein the copolymers of propylene are impact or random copolymers.

5. The polymer composition as claimed in claim 1 wherein the grafted monomer is selected from the group comprising ethylenically unsaturated carboxylic acids, ethylenically unsaturated carboxylic acid anhydrides, derivatives of such acids, and mixtures of thereof.

6. The polymer composition as claimed in claim 5 wherein the grafted monomer is maleic anhydride.

7. The modified polypropylene of claim 1 having a melt flow rate (MFR) of at least 1000 dg/min and a grafted monomer content of at least 2.0 weight percent.

8. A method for making a grafted maleated polypropylene polymer having a melt flow rate (MFR) of at least 500 dg/min as measured by ASTM standard E-1238 (190° C., 2160 g) and a grafted monomer content of at least 1 weight percent of functionalized polypropylene, which comprises the steps of:

(a) feeding into a twin screw extruder the polypropylene polymer and maleic anhydride so that the polypropylene begins to melt;

(b) adding to the extruder at a point where the polypropylene begins to melt a peroxide initiator and causing the peroxide to start to decompose;

(c) mixing the polypropylene, peroxide initiator, and maleic anhydride in the extruder while venting volatiles; and (d) extruding the formed maleated grafted polypropylene polymer through a die as strands and chopping the strands into pellets.

* * * * *

UNITED STATES PATENT AND TRADEMARK OFFICE
CERTIFICATE OF CORRECTION

PATENT NO. : 6,228,948 B1
DATED : May 8, 2001
INVENTOR(S) : Vicki Flaris, David John Mitchell It is certified that error appears in the above-identified patent and that said Letters Patent is hereby corrected as shown below:

Column 3,
Line 44, delete [are]; add "is"

Column 7, claim 5,
Line 52, delete second [of] - tives of such acids, and mixtures [of] thereof.

Signed and Sealed this

Nineteenth Day of February, 2002

Attest:

JAMES E. ROGAN
Attesting Officer        Director of the United States Patent and Trademark Office

UNITED STATES PATENT AND TRADEMARK OFFICE
CERTIFICATE OF CORRECTION

PATENT NO.     : 6,228,948 B1  
DATED          : May 8, 2001  
INVENTOR(S)    : Vicki Flaris and David John Mitchell Page 1 of 1

It is certified that error appears in the above-identified patent and that said Letters Patent is hereby corrected as shown below:

<u>Title page,</u>
Item [73] Assignee, delete "E.I. du Pont de Nemours and Company, Wilmington, DE (US)" add -- DuPont Canada, Inc., Mississauga, Canada --

Signed and Sealed this

Twenty-eighth Day of May, 2002

*Attest:*

JAMES E. ROGAN
*Attesting Officer*          *Director of the United States Patent and Trademark Office*